United States Patent
Furuta et al.

(10) Patent No.: US 10,636,575 B2
(45) Date of Patent: Apr. 28, 2020

(54) FURUTA AND PARA-FURUTA POLYMER FORMULATIONS AND CAPACITORS

(71) Applicant: Capcitor Sciences Incorporated, Menlo Park, CA (US)

(72) Inventors: Paul T. Furuta, Sunnyvale, CA (US); Pavel I. Lazarev, Menlo Park, CA (US); Barry K. Sharp, Redwood City, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 31 days.

(21) Appl. No.: 15/675,594

(22) Filed: Aug. 11, 2017

(65) Prior Publication Data

US 2018/0061582 A1 Mar. 1, 2018

Related U.S. Application Data

(63) Continuation-in-part of application No. 15/043,186, filed on Feb. 12, 2016, now abandoned, and a continuation-in-part of application No. 15/043,209, filed on Feb. 12, 2016, now abandoned.

(51) Int. Cl.
| | |
|---|---|
| *H01G 9/028* | (2006.01) |
| *H01B 3/44* | (2006.01) |
| *C08F 220/18* | (2006.01) |
| *C08F 220/06* | (2006.01) |
| *C08K 5/00* | (2006.01) |
| *C08F 220/34* | (2006.01) |
| *H01G 4/32* | (2006.01) |
| *C08L 33/14* | (2006.01) |
| *H01G 4/18* | (2006.01) |
| *C08L 33/06* | (2006.01) |
| *H01B 1/12* | (2006.01) |
| *H01G 11/62* | (2013.01) |
| *H01G 11/56* | (2013.01) |
| *H01G 9/048* | (2006.01) |

(52) U.S. Cl.
CPC .......... *H01G 9/028* (2013.01); *C08F 220/06* (2013.01); *C08F 220/18* (2013.01); *C08F 220/34* (2013.01); *C08K 5/0016* (2013.01); *C08L 33/064* (2013.01); *C08L 33/14* (2013.01); *H01B 1/122* (2013.01); *H01B 3/447* (2013.01); *H01G 4/18* (2013.01); *H01G 4/32* (2013.01); *H01G 11/56* (2013.01); *H01G 11/62* (2013.01); *C08F 2220/1883* (2013.01); *C08F 2220/1891* (2013.01); *H01G 9/048* (2013.01)

(58) Field of Classification Search
None
See application file for complete search history.

(56) References Cited

U.S. PATENT DOCUMENTS

| | | |
|---|---|---|
| 4,549,034 A | 10/1985 | Sato et al. |
| 4,894,186 A | 1/1990 | Gordon et al. |
| 5,141,837 A | 8/1992 | Nguyen et al. |
| 5,583,359 A | 12/1996 | Ng et al. |
| 5,597,661 A | 1/1997 | Takeuchi et al. |
| 6,025,094 A | 2/2000 | Visco et al. |
| 6,519,136 B1 | 2/2003 | Chu et al. |

(Continued)

FOREIGN PATENT DOCUMENTS

| | | |
|---|---|---|
| CA | 2074848 A1 | 2/1998 |
| CN | 1582506 A | 2/2005 |

(Continued)

OTHER PUBLICATIONS

Co-Pending U.S. Appl. No. 15/469,126, to Lazarev et al, filed Mar. 24, 2017.

(Continued)

*Primary Examiner* — Marc S Zimmer
(74) *Attorney, Agent, or Firm* — BCF LLP

(57) ABSTRACT

An organic polymeric compound called a Furuta or para-Furuta polymer is characterized by polarizability and resistivity has repeating units of a general structural formula:

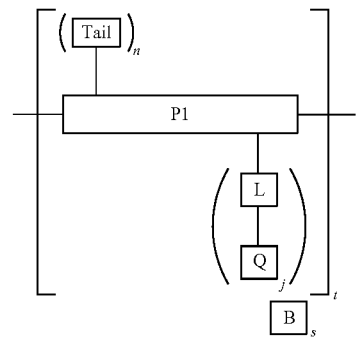

P1 may be acrylate, methacrylate, polypropylene, polyethylene, polyamide, polyaramid, polyester, siloxane, or polyethylene terephthalate. Tail is a resistive substitute. L is a linker group attached to an ionic functional group Q; j, a number of ionic functional groups Q, ranges from 1 to 5; n and m independently range from 3 to about 1000. Q is an ionic liquid ion, zwitterion, or polymeric acid. The number t ranges from 6 to 200,000. B is a counter ion, that can supply an opposite charge to balance a charge of the organic polymeric compound; s is a number of counter ions B. A plasticizer increases mobility of the polymers within the compound.

14 Claims, 1 Drawing Sheet

(56) References Cited

U.S. PATENT DOCUMENTS

| | | |
|---|---|---|
| 7,342,755 B1 | 3/2008 | Horvat et al. |
| 7,625,497 B2 | 12/2009 | Iverson et al. |
| 7,795,431 B2 | 9/2010 | Pschirer et al. |
| 7,808,771 B2 | 10/2010 | Nguyen et al. |
| 7,910,736 B2 | 3/2011 | Koenemann et al. |
| 7,990,679 B2 | 8/2011 | Ehrenberg et al. |
| 8,372,527 B2 | 2/2013 | Morishita et al. |
| 8,527,126 B2 | 9/2013 | Yamamoto et al. |
| 8,766,566 B2 | 7/2014 | Baba et al. |
| 8,831,805 B2 | 9/2014 | Izumi et al. |
| 8,895,118 B2 | 11/2014 | Geivandov et al. |
| 9,293,260 B2 | 3/2016 | Schmid et al. |
| 9,589,727 B2 | 3/2017 | Lazarev |
| 9,899,150 B2 | 2/2018 | Lazarev |
| 9,916,931 B2 | 3/2018 | Lazarev |
| 9,978,517 B2 | 5/2018 | Lazarev et al. |
| 2003/0103319 A1 | 6/2003 | Kumar et al. |
| 2003/0105365 A1 | 6/2003 | Smith et al. |
| 2003/0160595 A1 | 8/2003 | Provanzana et al. |
| 2004/0173873 A1 | 9/2004 | Kumar et al. |
| 2004/0223291 A1 | 11/2004 | Naito et al. |
| 2007/0181973 A1 | 8/2007 | Hung et al. |
| 2008/0002329 A1 | 1/2008 | Pohm et al. |
| 2008/0150484 A1 | 6/2008 | Kimball et al. |
| 2008/0266750 A1 | 10/2008 | Wu et al. |
| 2008/0283283 A1 | 11/2008 | Abe et al. |
| 2009/0184355 A1 | 7/2009 | Brederlow et al. |
| 2010/0085521 A1 | 4/2010 | Kasianova et al. |
| 2010/0172066 A1 | 7/2010 | Baer et al. |
| 2010/0269731 A1 | 10/2010 | Jespersen et al. |
| 2010/0309606 A1 | 12/2010 | Allers et al. |
| 2010/0315043 A1 | 12/2010 | Chau |
| 2011/0042649 A1 | 2/2011 | Duvall et al. |
| 2011/0079773 A1 | 4/2011 | Wasielewski et al. |
| 2012/0008251 A1 | 1/2012 | Yu et al. |
| 2012/0033342 A1 | 2/2012 | Ito et al. |
| 2012/0059307 A1 | 3/2012 | Harris et al. |
| 2012/0274145 A1 | 11/2012 | Taddeo |
| 2013/0056720 A1 | 3/2013 | Kim et al. |
| 2013/0187475 A1 | 7/2013 | Vendik et al. |
| 2013/0224473 A1 | 8/2013 | Tassell et al. |
| 2013/0342967 A1 | 12/2013 | Lai et al. |
| 2014/0035100 A1 | 2/2014 | Cho |
| 2014/0036410 A1 | 2/2014 | Okamatsu et al. |
| 2014/0158340 A1 | 6/2014 | Dixler et al. |
| 2014/0169104 A1 | 6/2014 | Kan et al. |
| 2014/0316387 A1 | 10/2014 | Harris et al. |
| 2015/0008671 A1 | 1/2015 | Rentero et al. |
| 2015/0010849 A1* | 1/2015 | Elabd .............. H01M 8/103 429/492 |
| 2015/0249401 A1 | 9/2015 | Eriksen et al. |
| 2016/0001662 A1 | 1/2016 | Miller et al. |
| 2016/0020026 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |
| 2017/0117097 A1 | 4/2017 | Furuta et al. |
| 2017/0133167 A1 | 5/2017 | Keller et al. |
| 2017/0232853 A1 | 8/2017 | Lazarev et al. |
| 2017/0233528 A1 | 8/2017 | Sharp et al. |
| 2017/0236641 A1 | 8/2017 | Furuta et al. |
| 2017/0236642 A1 | 8/2017 | Furuta et al. |
| 2017/0236648 A1 | 8/2017 | Lazarev et al. |
| 2017/0237271 A1 | 8/2017 | Kelly-Morgan et al. |
| 2017/0237274 A1 | 8/2017 | Lazarev et al. |
| 2017/0287637 A1 | 10/2017 | Lazarev et al. |
| 2017/0287638 A1 | 10/2017 | Lazarev et al. |
| 2017/0301467 A1 | 10/2017 | Lazarev et al. |
| 2018/0033554 A1 | 2/2018 | Li et al. |
| 2018/0061582 A1 | 3/2018 | Furuta et al. |
| 2018/0122143 A1 | 5/2018 | Ellwood |
| 2018/0126857 A1 | 5/2018 | Kelly-Morgan |
| 2018/0137978 A1 | 5/2018 | Hein et al. |
| 2018/0137984 A1 | 5/2018 | Furuta et al. |
| 2018/0158616 A1 | 6/2018 | Lazarev et al. |

FOREIGN PATENT DOCUMENTS

| | | |
|---|---|---|
| CN | 100449661 C | 1/2009 |
| CN | 1748271 B | 6/2010 |
| CN | 102426918 A | 4/2012 |
| CN | 103261370 A | 8/2013 |
| CN | 203377785 U | 1/2014 |
| CN | 103755703 A | 4/2014 |
| CN | 103986224 A | 8/2014 |
| CN | 103258656 B | 8/2015 |
| DE | 102010012949 A1 | 9/2011 |
| EP | 0791849 A1 | 8/1997 |
| EP | 2108673 A1 | 10/2009 |
| EP | 1990682 B1 | 1/2015 |
| JP | S6386731 A | 4/1988 |
| JP | 2000100484 A | 4/2000 |
| JP | 2001093778 A | 4/2001 |
| RU | 2512880 C2 | 4/2014 |
| WO | 0139305 A1 | 5/2001 |
| WO | 2009144205 A1 | 12/2009 |
| WO | 2009158553 A2 | 12/2009 |
| WO | 2011137137 A1 | 11/2011 |
| WO | 2012142460 A1 | 10/2012 |
| WO | 2012162500 A2 | 11/2012 |
| WO | 2013009772 A1 | 1/2013 |
| WO | 2013085467 A1 | 6/2013 |
| WO | 2015175522 A1 | 11/2015 |

OTHER PUBLICATIONS

D C Tiwari, et al: "Temperature dependent studies of electric and dielectric properties of polythiophene based nano composite", Indian Journal of Pure & Applied Physicsvol. 50, Jan. 2012. pp. 49-56.

Extended European Search Report dated Dec. 11, 2017 for European Patent Application No. 15792494.5.

Extended European Search Report dated Aug. 8, 2018 for European Patent Application No. 16756391.5.

Extended European Search Report dated Sep. 24, 2018 for European Patent Application No. 15856609.1.

Extended European Search Report dated Sep. 26, 2018 for European Patent Application No. 16797411.2.

Extended European Search Report for Application No. 15792405.1, dated Nov. 10, 2017.

Final Office Action for U.S. Appl. No. 15/043,186, dated Feb. 14, 2018.

Final Office Action for U.S. Appl. No. 15/043,247, dated Oct. 24, 2018.

Final Office Action for U.S. Appl. No. 15/043,249, dated Feb. 6, 2018.

Final Office Action for U.S. Appl. No. 15/043,315, dated Jun. 7, 2018.

Final Office Action for U.S. Appl. No. 15/194,224, dated Jan. 30, 2018.

Final Office Action for U.S. Appl. No. 15/449,587, dated Oct. 10, 2018.

Final Office Action for U.S. Appl. No. 15/710,587, dated Nov. 6, 2018.

International Search Report and Written Opinion dated Jul. 31, 2017 for International Patent Application PCT/US2017/024589.

International Search Report and Written Opinion dated Feb. 23, 2018 for International Patent Application No. PCT/US17/64252.

International Search Report and Written Opinion dated Jun. 7, 2017 for International Application No. PCT/US2017/24589, to Pavel Ivan Lazarev, filed Jun. 7, 2017.

M. Jurow et al, "Porphyrins as molectular electronic components of functional devices", Coordination Chemistry Reviews, Elsevier Science, Amsterdam NL, vol. 254, No. 19-20, Oct. 1, 2010, pp. 2297-2310.

Non-Final Action for U.S. Appl. No. 15/043,186, dated Feb. 14, 2018.

(56) References Cited

OTHER PUBLICATIONS

Non-Final Office Action for U.S. Appl. No. 15/043,247, dated Jun. 7, 2018.
Non-Final Office Action for U.S. Appl. No. 15/043,315, dated Dec. 26, 2017.
Non-Final Office Action for U.S. Appl. No. 15/163,595, dated Jan. 17, 2018.
Non-Final Office Action for U.S. Appl. No. 15/430,339, dated Jul. 11, 2018.
Non-Final Office Action for U.S. Appl. No. 15/430,307, dated Jul. 16, 2018.
Non-Final Office Action for U.S. Appl. No. 15/449,587, dated May 21, 2018.
Non-Final Office Action for U.S. Appl. No. 15/710,587, dated Jul. 3, 2018.
Non-Final Office Action for U.S. Appl. No. 15/782,752, dated Sep. 21, 2018.
Non-Final Office Action for U.S. Appl. No. 15/801,240, dated Oct. 19, 2018.
Non-Final Office Action for U.S. Appl. No. 15/805,016, dated Jun. 4, 2018.
Updated Notice of Allowance for U.S. Appl. No. 14/710,480, dated Jan. 17, 2018.
Non-Final Office Action for U.S. Appl. No. 15/043,247, dated Feb. 20, 2018.
Non-Final Office Action for U.S. Appl. No. 15/430,391, dated Jul. 20, 2018.
Notice of Allowance for U.S. Appl. No. 14/710,480, dated Nov. 24, 2017.
Notice of Allowance for U.S. Appl. No. 14/710,480, dated Jan. 11, 2018.
Notice of Allowance for U.S. Appl. No. 14/719,072, dated Nov. 16, 2017.
Notice of Allowance for U.S. Appl. No. 14/752,600, dated Nov. 24, 2017.
Notice of Allowance for U.S. Appl. No. 14/752,600, dated Dec. 4, 2017.
Notice of Allowance for U.S. Appl. No. 14/919,337, dated Mar. 5, 2018.
Notice of Allowance for U.S. Appl. No. 14/931,757, dated Dec. 29, 2017.
Notice of Allowance for U.S. Appl. No. 14/931,757, dated Feb. 8, 2018.
Notice of Allowance for U.S. Appl. No. 15/090,509, dated Jan. 24, 2018.
Notice of Allowance for U.S. Appl. No. 15/163,595, dated Jul. 30, 2018.
Office Action dated May 18, 2018 for Chinese Patent Application for Invention No. 201580025110.
Office Action dated Dec. 13, 2017 for Taiwan Patent Application No. 106104499.
Office Action dated Dec. 13, 2017 for Taiwan Patent Application No. 106104500.
Office Action dated Jan. 25, 2018 for Chinese patent application No. 20158005146.4.
Search Report and Written Opinion dated Feb. 7, 2018 for Singapore Patent Application No. 11201609435W.
Supplementary Notice of Allowance for U.S. Appl. No. 14/752,600, dated Dec. 4, 2017.
Taiwanese Office Action for 886103 Application No. 106142206, dated Jul. 5, 2018.
Final Office Action for U.S. Appl. No. 15/043,247, dated Oct. 4, 2017.
Handy, Scott T. "Ionic Liquids-Classes and Properties" Published Sep. 2011, Accessed Aug. 28, 2017, InTechweb.org.
Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.
Hsing-Yang Tsai et al, "Synthesis and optical properties of novel asymmetric perylene bisimides", Journal of Luminescence, vol. 149, pp. 103-111 (2014).
International Search Report and Written Opinion for International Application No. PCT/US2016/019641, dated Jul. 12, 2016.
International Search Report and Written Opinion for International Application No. PCT/US2017/016862, dated Aug. 14, 2017.
International Search Report and Written Opinion for International Application No. PCT/US2017/24371, dated Aug. 2, 2017.
International Search Report and Written Opinion for International Application No. PCT/US2017/24600, dated Aug. 14, 2017.
Johnson, Kieth E. "What's an Ionic Liquid?" The Electrochemical Society Interface, Published Spring 2007, pp. 38-41, Accessed Aug. 28, 2017.
Maddalena, Francesco "Why are Ionic Liquids, Liquids?" http://www.quora.com/why-are-ionic-liquids-liquids?, Published Jan. 26, 2017, Accessed Aug. 28, 2017.
Nagabrahmandachari et al. "Synthesis and Spectral Analysis of Tin Tetracarboxylates and Phosphinates" Indian Journal of Chemistry—Section A, 1995, vol. 34A, pp. 658-660.
Non-Final Office Action for U.S. Appl. No. 15/043,247, dated Jun. 22, 2017.
Non-Final Office Action for U.S. Appl. No. 15/090,509, dated Jun. 22, 2017.
Non-Final Office Action for U.S. Appl. No. 15/194,224, dated Sep. 27, 2017.
Notice of Allowance for U.S. Appl. No. 14/710,480, dated Oct. 6, 2017.
Notice of Allowance for U.S. Appl. No. 14/919,337, dated Nov. 8, 2017.
Notice of Allowance for U.S. Appl. No. 14/931,757, dated Oct. 31, 2017.
Notice of Allowance for U.S. Appl. No. 15/053,943, dated Aug. 14, 2017.
Office Action dated Oct. 19, 2017 for Taiwan patent Application No. 106104501.
Co-Pending U.S. Appl. No. 15/430,307, to Lazarev et al., filed Feb. 10, 2017.
Co-Pending U.S. Appl. No. 15/675,614, to Kelly-Morgan, filed Aug. 11, 2017.
Co-Pending U.S. Appl. No. 15/194,224, to Lazarev et al., filed Jun. 27, 2016.
Co-Pending U.S. Appl. No. 15/449,587, to Lazarev et al., filed Mar. 3, 2017.
Co-Pending U.S. Appl. No. 15/368,171, to Lazarev et al., filed Dec. 2, 2016.

* cited by examiner

FURUTA AND PARA-FURUTA POLYMER FORMULATIONS AND CAPACITORS

CLAIM OF PRIORITY

This application is a continuation-in-part of U.S. patent application Ser. Nos. 15/043,186 and 15/043,209, both of which were filed Feb. 12, 2016, the entire contents of both of which are incorporated herein by reference.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present disclosure relates generally to passive components of electrical circuit and more particularly to an organic polymeric compound and capacitor based on this material and intended for energy storage.

BACKGROUND

A capacitor is a passive electronic component that is used to store energy in the form of an electrostatic field, and comprises a pair of electrodes separated by a dielectric layer. When a potential difference exists between the two electrodes, an electric field is present in the dielectric layer. An ideal capacitor is characterized by a single constant value of capacitance, which is a ratio of the electric charge on each electrode to the potential difference between them. For high voltage applications, much larger capacitors are necessary.

One important characteristic of a dielectric material is its breakdown field. This corresponds to the value of electric field strength at which the material suffers a catastrophic failure and conducts electricity between the electrodes. For most capacitor geometries, the electric field in the dielectric can be approximated by the voltage between the two electrodes divided by the spacing between the electrodes, which is usually the thickness of the dielectric layer. Since the thickness is usually constant, it is more common to refer to a breakdown voltage, rather than a breakdown field. There are a number of factors that can dramatically reduce the breakdown voltage. In particular, geometry of the conductive electrodes is important factor affecting breakdown voltage for capacitor applications. In particular, sharp edges or points hugely increase the electric field strength locally and can lead to a local breakdown. Once a local breakdown starts at any point, the breakdown will quickly "trace" through the dielectric layer until it reaches the opposite electrode and causes a short circuit.

Breakdown of the dielectric layer usually occurs as follows. The intensity of an electric field becomes high enough to "pull" electrons from atoms of the dielectric material and makes them conduct an electric current from one electrode to another. Presence of impurities in the dielectric or imperfections of the crystal structure can result in an avalanche breakdown as observed in semiconductor devices.

Another important characteristic of a dielectric material is its dielectric permittivity. Different types of dielectric materials are used for capacitors and include ceramics, polymer films, paper, and electrolytes of different kinds. The most widely used polymer film materials are polypropylene and polyester. Increasing the dielectric permittivity increases the possible volumetric energy density of a capacitor, which makes it an important technical task.

An ultra-high dielectric constant composite of polyaniline, PANI-DBSA/PAA, was synthesized using in situ polymerization of aniline in an aqueous dispersion of polyacrylic acid (PAA) in the presence of dodecylbenzene sulfonate (DBSA) (see, Chao-Hsien Hoa et al., "High dielectric constant polyaniline/poly(acrylic acid) composites prepared by in situ polymerization", Synthetic Metals 158 (2008), pp. 630-637). The water-soluble PAA served as a polymeric stabilizer, protecting the PANI particles from macroscopic aggregation. A very high dielectric constant of about $2.0 \times 10^5$ (at 1 kHz) was obtained for the composite containing 30% PANI by weight. Influence of the PANI content on the morphological, dielectric and electrical properties of the composites was investigated. Frequency dependence of dielectric permittivity, dielectric loss, loss tangent and electric modulus were analyzed in the frequency range from 0.5 kHz to 10 MHz. SEM micrograph revealed that composites with high PANI content (i.e., 20 wt. %) consisted of numerous nano-scale PANI particles that were evenly distributed within the PAA matrix. High dielectric constants were attributed to the sum of the small capacitors of the PANI particles. The drawback of this material is a possible occurrence of percolation and formation of at least one continuous electrically conductive channel under electric field with probability of such an event increasing with an increase of the electric field. When at least one continuous electrically conductive channel (track) through the neighboring conducting PANI particles is formed between electrodes of the capacitor, it decreases a breakdown voltage of such capacitor.

Colloidal polyaniline particles stabilized with a water-soluble polymer, poly(N-vinylpyrrolidone) [poly('-vinylpyrrolidin-2-one)], have been prepared by dispersion polymerization. The average particle size, 241±50 nm, have been determined by dynamic light scattering (see, Jaroslav Stejskal and Irina Sapurina, "Polyaniline: Thin Films and Colloidal Dispersions (IUPAC Technical Report)", Pure and Applied Chemistry, Vol. 77, No. 5, pp. 815-826 (2005).

Single crystals of doped aniline oligomers are produced via a simple solution-based self-assembly method (see, Yue Wang, et. al., "Morphological and Dimensional Control via Hierarchical Assembly of Doped Oligoaniline Single Crystals", J. Am. Chem. Soc. 2012, 134, pp. 9251-9262). Detailed mechanistic studies reveal that crystals of different morphologies and dimensions can be produced by a "bottom-up" hierarchical assembly where structures such as one-dimensional (1-D) nanofibers can be aggregated into higher order architectures. A large variety of crystalline nanostructures, including 1-D nanofibers and nanowires, 2-D nanoribbons and nanosheets, 3-D nanoplates, stacked sheets, nanoflowers, porous networks, hollow spheres, and twisted coils, can be obtained by controlling the nucleation of the crystals and the non-covalent interactions between the doped oligomers. These nanoscale crystals exhibit enhanced conductivity compared to their bulk counterparts as well as interesting structure-property relationships such as shape-dependent crystallinity. Furthermore, the morphology and dimensions of these structures can be largely rationalized and predicted by monitoring molecule-solvent interactions via absorption studies. Using doped tetra-aniline as a model system, the results and strategies presented in this disclosure provide insight into the general scheme of shape and size control for organic materials.

Materials with high dielectric permittivity based on composite materials containing polarized particles (such as PANI particles) may demonstrate a percolation phenomenon. The layered polycrystalline structure formed by the composite material has multiple tangling chemical bonds on borders between crystallites. When the composite material that is used has a high dielectric permittivity and possesses a polycrystalline structure, a percolation may occur along the borders of crystal grains.

Hyper-electronic polarization of organic compounds is described in greater detail in Roger D. Hartman and Herbert A. Pohl, "Hyper-electronic Polarization in Macromolecular Solids", Journal of Polymer Science: Part A-1 Vol. 6, pp. 1135-1152 (1968). Hyper-electronic polarization may be viewed as the electrical polarization of external fields due to the pliant interaction with charged pairs of excitons, in which the charges are molecularly separated and range over molecularly limited domains. Four polyacene quinone radical polymers were investigated. These polymers at 100 Hz had dielectric constants of 1800-2400, decreasing to about 58-100 at 100,000 Hz. An essential drawback of the described method of production of the material is the use of high pressure (up to 20 kbars) for forming the samples intended for measurement of dielectric constants.

The Influence on the dielectric properties of the acrylic acid grafted on to isotactic polypropylene was investigated using density functional theory calculations, both in the molecular modeling and three-dimensional (3D) bulk periodic system frameworks (see, Henna Russka et al., "A Density Functional Study on Dielectric Properties of Acrylic Acid Crafted Polypropylene", *The Journal of Chemical Physics*, 134, 134904 (2011)). In the molecular modeling calculation which modeled, the polarizability volume, and the polarizability volume per mass, which reflects the permittivity of the polymer, as well as the HOMO-LUMO gap, it was discovered that one of the important measures indicating the electrical breakdown voltage strength was chain length and carboxyl mixture ratios.

The lowest unoccupied molecular orbital (LUMO) energies of a variety of molecular organic semiconductors have been evaluated using inverse photoelectron spectroscopy data and are compared with data determined from the optical energy gap, electrochemical reduction potentials, and density functional theory calculations (see, Peter I. Djuravich et al., "Measurement of the lowest unoccupied molecular orbital energies of molecular organic semiconductors", Organic Electronics, 10, pp. 515-520, (2009)).

Capacitors as energy storage devices have well-known advantages versus electrochemical energy storage, e.g. a battery. Compared to batteries, capacitors are able to store energy with very high power density, i.e. charge/recharge rates, have long shelf lives with little degradation, and can be charged and discharged (cycled) hundreds of thousands or millions of times with little degradation. However, capacitors often do not store energy in small volume or weight as in case of a battery, or at low energy storage cost, which makes capacitors impractical for some applications, for example electric vehicles. Accordingly, it may be an advance in energy storage technology to provide capacitors of higher volumetric and mass energy storage density and lower cost.

SUMMARY

The present disclosure provides a formulation of organic polymeric or co-polymeric compounds characterized by high polarizability and high resistivity, referred to herein as Furuta and para-Furuta. A Furuta co-polymer has the following general structural formula:

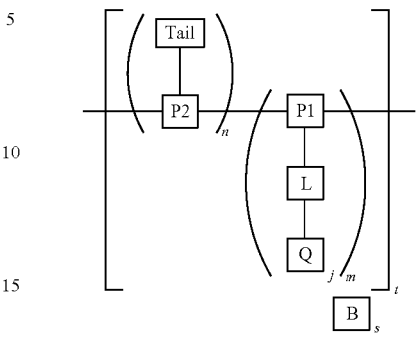

A para-Furuta polymer has the following general structural formula:

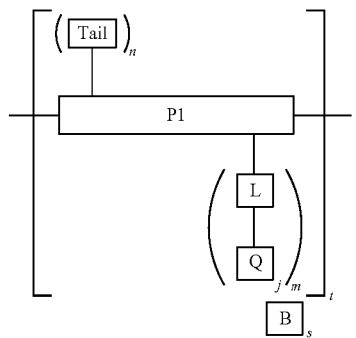

wherein a backbone structure of the Furuta and para-Furuta polymer comprises repeat units of first type P1-Tail and repeat units of second type P2-L-Q, which randomly repeat or repeat units of P. P1 and P2 are structural units are independently selected from the list comprising acrylic acid, methacrylate, repeat units polypropylene (—[$CH_2$—CH($CH_3$)]—), repeat units of polyamide, repeat units of polyester, repeat units of polyaramid, repeat units of polyethylene (—[$CH_2$]—), siloxane, and repeat units polyethylene terephthalate (sometimes written poly(ethylene terephthalate)) for which the repeat unit is —$CH_2$—$CH_2$—O—CO—$C_6H_4$—CO—O—. The parameters n and m are each independently a number of Tail and L-Q units respectively attached to the backbone structure, which is in the range from 3 to 100,000. The ratio n:m may range from 10:1 and 1:10. Tail is a resistive substitute, which is an oligomer of polymeric material, which may be characterized by a HOMO-LUMO gap no less than 2 eV. L-Q have an ionic functional group Q that is connected to the P1 structural unit via a linker group L. As used herein the term "oligomer of a polymer" refers to a short chain polymer (less than about 15 repeat units long) attached to a primary polymer.

The ionic functional group Q is comprised of ionic liquid ions from the class of ionic compounds that are used in ionic liquids, zwitterions, or polymeric acids. The parameter j is a number of Q groups attached to L, and ranges from 1 to 5. The energy interaction of the ionic liquid ions tethered via L to discrete P1 structural units is less than kT, where k is Boltzmann constant and T is the temperature of environment. Parameter t is number of repeat units of Furuta or para-Furuta polymers in the range from 6 to 200,000. B's are counter ions, which are molecules, oligomers, or a Furuta or para-Furuta polymer that can supply an opposite charge to balance a charge of the polymer; s is number of the counter ions. The ratio s:(mj) may range from 1:1 to 1:5, and in its preferred embodiment is 1:1.

In another aspect of the present disclosure provides a metadielectric material comprising one or more types of Furuta and/or para-Furuta polymers. The Furuta/para-Furuta polymers comprising an organic polymeric compound as disclosed above with a resistive envelope built with resistive substitute Tail and polarizable ionic liquids/zwitterions/polymeric acids (Q) tethered to a structural backbone where the ionic groups Q have an electronic or an ionic type of polarizability provided by the electronic conductivity or the limited ion mobility of the ionic functional groups Q.

Another aspect of the present disclosure provides a metacapacitor comprising two metal electrodes positioned parallel to each other and which can be rolled or flat and planar A molecular dielectric film is disposed between the electrodes and comprises an organic polymeric compound of the type disclosed above with a resistive envelope built with the resistive substitute Tails and polarizable ionic liquids/zwitterions/polymeric acids tethered to a polymer backbone where the ionic liquid has an electronic or ionic type of polarizability provided by the electronic conductivity or the limited ion mobility of ionic functional groups Q.

DETAILED DESCRIPTION

Figure 1A:
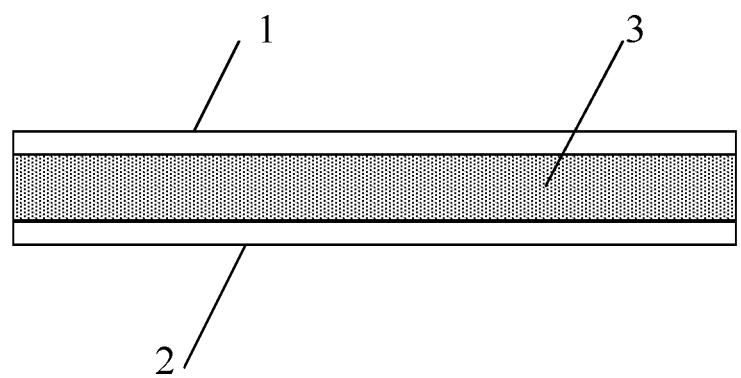
FIG. 1A schematically shows the disclosed capacitor with flat and planar electrodes.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides an organic polymeric compound. In one embodiment of the organic polymeric compound, the resistive substitute Tails are independently selected from the list comprising: polypropylene (PP), polyethylene terephthalate (PET), polyphenylene sulfide (PPS), polyethylene naphthalate (PEN), polycarbonate (PP), polystyrene (PS), and polytetrafluoroethylene (PTFE). In another embodiment of the organic polymeric compound, the resistive substitutes Tail are independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups. The resistive substitute Tail may be added after polymerization. In yet another embodiment of the present disclosure, it is preferable that the HOMO-LUMO gap is no less than 4 eV. In still another embodiment of the present disclosure, it is even more preferable that the HOMO-LUMO gap is no less than 5 eV. The ionic functional group Q comprises one or more ionic liquid ions from the class of ionic compounds that are used in ionic liquids, zwitterions, or polymeric acids. The energy of interactions between Q group ions on discrete P1 or P structural units may be less than kT, where k is Boltzmann constant and T is the temperature of environment. The temperature of environment may be in range between −60 and 150° C. The preferable range of temperatures is between −40 and 100° C. The energetic interactions between ions depends on the effective radius of ions. Therefore, by increasing the steric hindrance between ions it is possible to reduce the energy of interactions between ions. In one embodiment of the present invention, at least one ionic liquid ion is selected from the list comprising $[NR_4]^+$, $[PR_4]^+$ as cation and $[-CO_2]^-$, $[-SO_3]^-$, $[-SR_5]^-$, $[-PO_3R]^-$, $[-PR_5]^-$ as anion, wherein R is selected from the list comprising H, alkyl, and fluorine. The functional group Q may be charged after or before polymerization. In another embodiment of the present invention, the linker group L is oligomer selected from structures 1 to 7 as given in Table 1.

TABLE 1

Examples of the oligomer linker group

| Structure | # |
|---|---|
| [—O—C(=O)—CH₂—CH₂—]$_n$ | 1 |
| [—O—CH₂—CH₂—CH₂—CH₂—]$_n$ | 2 |
| [—CH₂—CH₂—CH₂—CH₂—]$_n$ | 3 |
| [—CH₂—N—]$_n$ | 4 |
| [—CH₂—C—]$_n$ | 5 |
| [—Si(—)(—)—]$_n$ | 6 |
| [—Si(—)(—)—O—]$_n$ | 7 |

In yet another embodiment of the present invention, the linker group L is selected from structures 8 to 17 as given in Table 2.

TABLE 2

Examples of the linker group

| Structure | # |
|---|---|
| —O— | 8 |
| —NH— | 9 |
| —O—C(=O)— | 10 |

TABLE 2-continued

Examples of the linker group

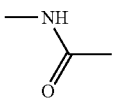 11

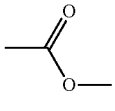 12

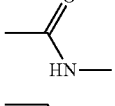 13

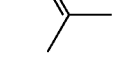 14

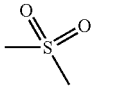 15

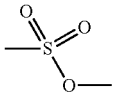 16

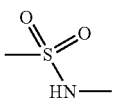 17

In yet another embodiment of the present invention, the linker group L is selected from the list comprising —[CH$_2$]$_n$—, —[CF$_2$]$_n$—, SiR$_2$O, and CH2CH2O, wherein n is 1-22 and R is selected from the list comprising H, alkyl, and fluorine. The ionic functional group Q and the linker groups L may be added after polymerization. Further, in yet another embodiment of the present invention, the linker group L is not present and the ionic species Q are attached directly to the backbone.

In another aspect, the present disclosure provides a dielectric material (sometimes called a metadielectric) comprising of one or more of the class of Furuta/para-Furuta polymers comprising protected or hindered ions of zwitterion, cationic liquid ions, anionic liquid ions, or polymeric acid types described hereinabove. The metadielectric material may be a mixture of zwitterion type Furuta/para-Furuta polymers, or positively charged (cation) Furuta/para-Furuta polymers and negatively charged (anion) Furuta/para-Furuta polymers, polymeric acid Furuta/para-Furuta polymers, or any combination thereof. The mixture of Furuta/para-Furuta polymers may form or be induced to form supra-structures via hydrophobic and ionic interactions. By way of example, but not limiting in scope, the cation(s) on a positively charged Furuta/para-Furuta polymer replaces the B counter ions of the anion(s) on a negatively charged Furuta/para-Furuta polymer parallel to the positively charged Furuta/para-Furuta polymer and vice versa; and the resistive Tails of neighboring Furuta/para-Furuta polymers further encourages stacking via van der Waals forces, which increases ionic group isolation. Metadielectrics comprising both cationic and anionic Furuta/para-Furuta polymers preferably have a 1:1 ratio of cationic and anionic Furuta/para-Furuta polymers.

The tails of hydrocarbon (saturated and/or unsaturated), fluorocarbon, siloxane, and/or polyethylene glycol linear or branched act to insulate the linked/tethered/partially immobilized polarizable ionic liquids, zwitterions, or polymeric acids (ionic Q groups). The tails insulate the ionic Q groups from other ionic Q groups on the same or parallel Furuta/para-Furuta polymer via steric hindrance of the ionic Q groups' energy of interaction, which favorably allows discrete polarization of the ionic Q groups (i.e. polarization of cationic liquid and anionic liquid tethered/partially immobilized to parallel Furuta/para-Furuta polymers). Further, the tails insulate the ionic groups of supra-structures from each other. Parallel Furuta/para-Furuta polymers may arrange or be arranged such that counter ionic liquids (i.e. tethered/partially immobilized ionic liquids (Qs) of cation and anion types) are aligned opposite from one another (sometimes known as cationic Furuta/para-Furuta polymers and anionic Furuta/para-Furuta polymers).

The Furuta/para-Furuta polymers have hyperelectronic or ionic type polarizability. "Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

Further, a metadielectric layer may be comprised of one or more types of zwitterion Furuta/para-Furuta polymer and/or selected from the anionic Q group types and cationic Q group types and/or polymeric acids, which may have the following general arrangement of Furuta/para-Furuta polymers:

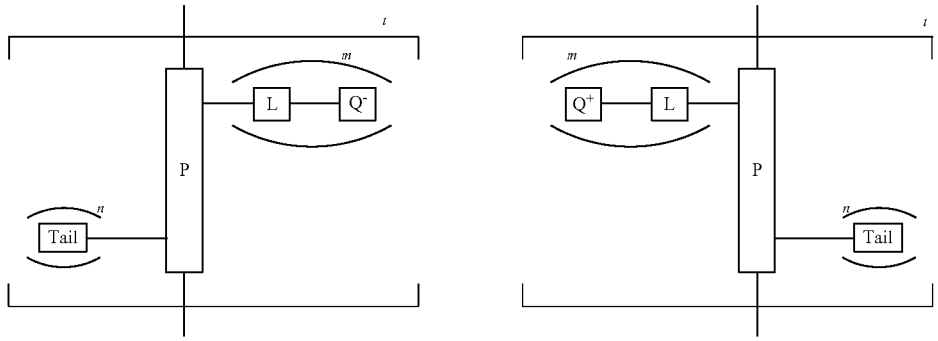

In yet another aspect, the present disclosure provides a meta-capacitor, an example of which is shown schematically in FIG. 1A. The meta-capacitor comprises a first electrode 1, a second electrode 2, and a metadielectric layer 3 disposed between said first and second electrodes. The electrodes 1 and 2 may be made of a metal, such as copper, zinc, or aluminum or other conductive material and are generally planar in shape.

The electrodes 1, 2 may be flat and planar and positioned parallel to each other. Alternatively, the electrodes may be planar and parallel, but not necessarily flat, e.g., they may be coiled, rolled, bent, folded, or otherwise shaped to reduce the overall form factor of the capacitor, while maintaining an approximately constant spacing d between the electrodes 1, 2. It is also possible for the electrodes 1, 2, to be non-flat, non-planar, or non-parallel or some combination of two or more of these. By way of example and not by way of limitation, a spacing d between the electrodes 1, 2, which may correspond to the thickness of the Composite Dielectric Film layer 3, may range from about 100 nm to about 15 μm with a preferred range of between 1 μm and 10 μm. It should be noted that thicknesses of greater than 15 μm are possible and may be chosen to provide a mechanical advantage to the capacitor such as improving the rigidity. As noted in Equation (2) below, the maximum voltage $V_{bd}$ between the electrodes 1, 2 is approximately the product of the breakdown field $E_{bd}$ and the electrode spacing d.

$$V_{bd} = E_{bd}d \quad (2)$$

For example, if, $E_{bd}$=0.1 V/nm and the spacing d between the electrodes 1, 2 is 10 microns (10,000 nm), the maximum voltage $V_{bd}$ would be 1,000 volts.

The electrodes 1, 2 may have the same shape as each other, the same dimensions, and the same area A. By way of example, and not by way of limitation, the area A of each electrode 1, 2 may range from about 0.01 m² to about 1000 m². By way of example and not by way of limitation, for rolled capacitors, the electrodes may be up to, e.g., 1000 m long and 1 m wide.

These ranges are non-limiting. Other ranges of the electrode spacing d and area A are within the scope of the aspects of the present disclosure.

If the spacing d is small compared to the characteristic linear dimensions of electrodes (e.g., length and/or width), the capacitance C of the capacitor may be approximated by the formula:

$$C = \kappa\varepsilon_o A/d, \quad (3)$$

where $\varepsilon_o$ is the permittivity of free space (8.85×10⁻¹² Coulombs²/(Newton·meter²)) and κ is the dielectric constant of the dielectric layer. The energy storage capacity U of the capacitor may be approximated as:

$$U = \tfrac{1}{2}CV_{bd}^2 \quad (4)$$

which may be rewritten using equations (2) and (3) as:

$$U = \tfrac{1}{2}\kappa\varepsilon_o A E_{bd}^2 d \quad (5)$$

The energy storage capacity U is determined by the dielectric constant K, the area A, and the breakdown field $E_{bd}$. By appropriate engineering, a capacitor or capacitor bank may be designed to have any desired energy storage capacity U. By way of example, and not by way of limitation, given the above ranges for the dielectric constant K, electrode area A, and breakdown field $E_{bd}$ a capacitor in accordance with aspects of the present disclosure may have an energy storage capacity U ranging from about 500 Joules to about 2×10¹⁶ Joules.

For a dielectric constant K ranging, e.g., from about 100 to about 1,000,000 and constant breakdown field $E_{bd}$ between, e.g., about 0.1 and 0.5 V/nm, a capacitor of the type described herein may have a specific energy capacity per unit mass ranging from about 10 W·h/kg up to about 100,000 W·h/kg, though implementations are not so limited.

Figure 1B:
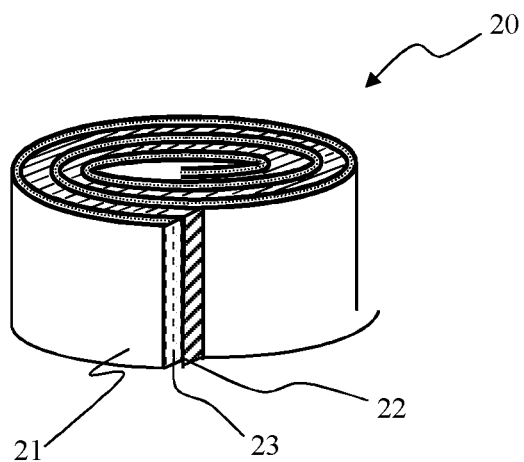
FIG. 1B schematically shows the disclosed capacitor with rolled (coiled) electrodes.

Aspects of the present disclosure include meta-capacitors that are coiled, e.g., as depicted in FIG. 1B. In this example, a meta-capacitor 20 comprises a first electrode 21, a second electrode 22, and a metadielectric material layer 23 of the type described hereinabove disposed between said first and second electrodes. The electrodes 21, 22 may be made of a metal, such as copper, zinc, or aluminum or other conductive material and are generally planar in shape. In one implementation, the electrodes and metadielectric material layer 23 are in the form of long strips of material that are sandwiched together and wound into a coil along with an insulating material, e.g., a plastic film such as polypropylene or polyester to prevent electrical shorting between the electrodes 21, 22. Examples of such coiled capacitor energy storage devices are described in detail in commonly-assigned U.S. patent application Ser. No. 14/752,600, filed Jun. 26, 2015, the entire contents of which are incorporated herein by reference.

A 4 kg meta-capacitor cell with a specific energy of 250 Wh/kg may be comprised of a metadielectric film 120 nm thick and an area 19000 m². Alternatively, a 4 kg meta-capacitor cell with a specific energy of 250 Wh/kg may be comprised of a metadielectric film 10.05 μm thick and a surface area 140 m².

In some embodiments, a 1 kg meta-capacitor cell with a specific energy of 1000 Wh/kg may be comprised of a metadielectric film 120 nm thick and an area 4700 m². Alternatively, a 1 kg meta-capacitor cell with a specific energy of 1000 Wh/kg may be comprised of a metadielectric film 10.05 μm thick and a surface area of 35 m².

In order that the invention may be more readily understood, reference is made to the following examples, which are intended to be illustrative of the invention, but are not intended to be limiting the scope.

Example 1

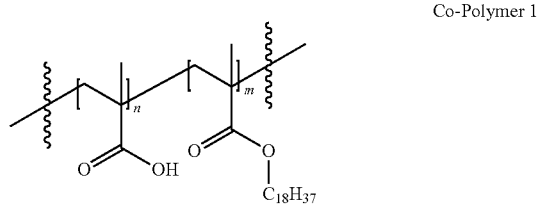

Co-Polymer 1

Co-Polymer 1 (poly(stearylmethacrylate-co-methacrylic acid). To a solution of 1.02 g (11.81 mmol) of methacrylic acid and 4.00 g (11.81 mmol) of stearylmethacrylate in 2.0 g isopropanol was added a solution of 0.030 g 2,2'-azobis (2-methylpropionitrile) (AIBN) in 5.0 g of toluene. The resulting solution was heated to 80 C for 20 hours in a sealed vial, after which it became noticeably viscous. NMR shows <2% remaining monomer. The solution was used without further purification in film formulations and other mixtures.

Example 2

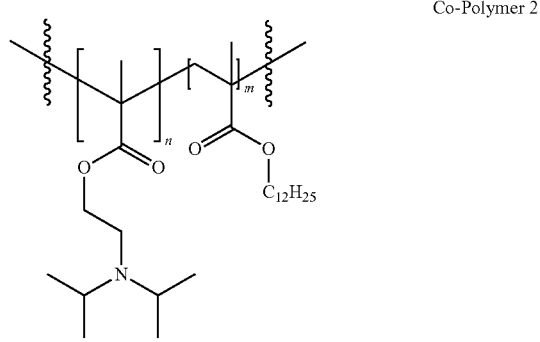

Co-Polymer 2

Co-Polymer 2 (poly(lauryl methacrylate-co-2-(Diisopropylamino)ethyl methacrylate). To a solution of 2.52 g (11.79 mmol) of 2-(diisopropylamino)ethyl methacrylate and 3.00 g (11.79 mmol) of laurylmethacrylate in 2.0 g toluene was added a solution of 0.030 g 2,2'-azobis(2-methylpropionitrile) (AIBN) in 4.0 g of toluene. The resulting solution was heated to 80 C for 20 hours in a sealed vial, after which it became noticeably viscous. NMR shows <2% remaining monomer. The solution was used without further purification in film formulations and other mixtures.

Example 3

Co-Polymer 1 and Co-Polymer 2 mixture (poly(stearylmethacrylate-co-methacrylic acid and poly(lauryl methacrylate-co-2-(Diisopropylamino)ethyl methacrylate mixture). 1.50 g of a 42 wt % by solids solution of co-polymer 1 was added to 1.24 g of a 56 wt % solution of co-polymer 2 with 1 g of isopropanol and mixed at 40 C for 30 minutes. The solution was used without further purification.

To any of the embodiments of the polymeric species, a plasticizer is added. The work of Kamlesh Pandey in "Effect of Plasticizers on Structural and Dielectric Behaviour of [PEO+(NH4)2C4H8(COO)2] Polymer Electrolyte", *Journal of Polymers*, 2013 Article ID 752596 teaches that plasticizers can increase the ion mobility in electrolytic polymers. A plasticizer should therefore allow the polar ionic fractions of the polymer to increase mobility in their local "pocket", the polar plasticizers should congregate in the polar areas of the polymer, and not be attracted to the "tail" phases. The plasticizer should thereby increase the mobility of the polymer while simultaneously thermally treating the final film product. The presence of a plasticizer can increase the tail phase alignment and create polar "pockets" for the ionic groups. Use of plasticizers can thereby improve the material's resistivity by assisting in supramolecular alignment of tail phases and ionic (polar) phases to smooth out an external electric field Preferred, non-limiting, plasticizers are selected from high boiling point aprotic solvents such as propylene carbonate, NMP (boiling point 202° C.), and DMSO (boiling point 189° C.).

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

The invention claimed is:

1. A metadielectric layer comprising a mixture of organic, polarizable, resistive, polymeric compounds consisting of repeating units of one of the following repeating unit:

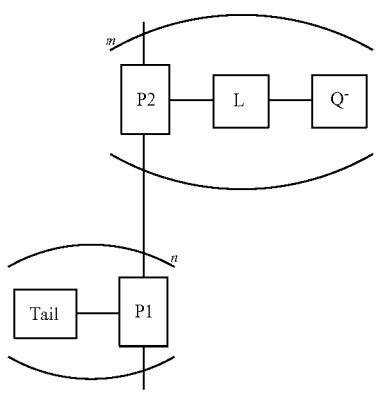

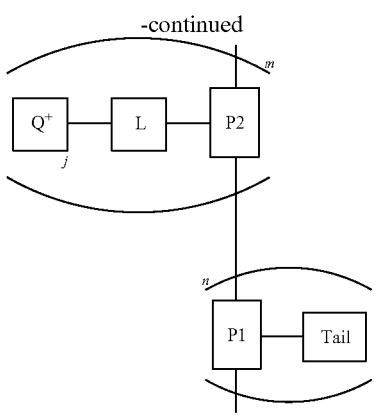

wherein P1 is a monomer unit of polyacrylate, polymethacrylate, polypropylene (PP), polyethylene (PE), polyamide, polyaramid, polyester, siloxane, or polyethylene terephthalate;

wherein Tail is independently selected from alkyl, aryl, substituted alkyl, substituted aryl, fluorinated alkyl, and chlorinated alkyl;

wherein j is a number of ionic functional groups Q ranging from 1 to 5;

wherein n and m are independently in the range from 3 to about 1000;

wherein $Q^+$ is a cationic functional group and $Q^-$ is an anionic functional group;

wherein L is a linker group attached to one or more of $Q^+$ and $Q^-$;

wherein t is a number of polymeric repeats of the structure from 6 to 200,000;

wherein P2 is a monomer unit of polyacrylate, polymethacrylate, polypropylene (PP), polyethylene (PE), polyamide, polyaramid, polyester, siloxane, polyethylene terephthalate; and wherein P2 and P1 polymerically repeat independently;

and at least one plasticizer to increase supramolecular order of the metadielectric for increased resistivity is included in the medielectric layer.

2. A composite metacapacitor comprising two metal electrodes and a metadielectric layer between the two electrodes, wherein the metadielectric layer is as defined in claim 1.

3. The metadielectric layer of claim 1, wherein the organic, polarizable, resistive, polymeric compound has a HOMO-LUMO gap of no less than 4 eV.

4. The metadielectric layer of claim 3, wherein the HOMO-LUMO gap is no less than 5 eV.

5. The metadielectric layer of claim 1, wherein the linker group L is selected from structures 1 to 7:

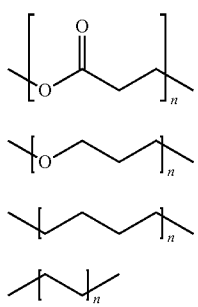

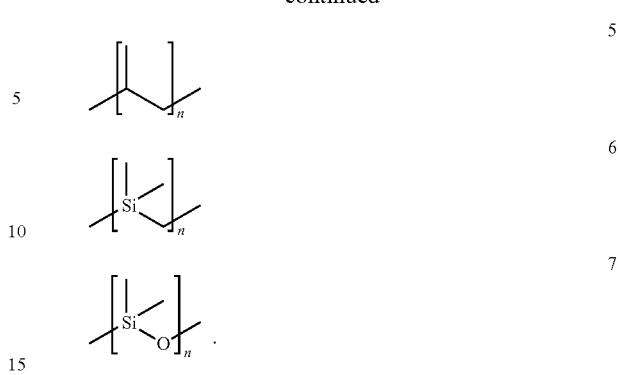

6. The metadielectric layer of claim 1, wherein the linker group L is selected from structures 8 to 17:

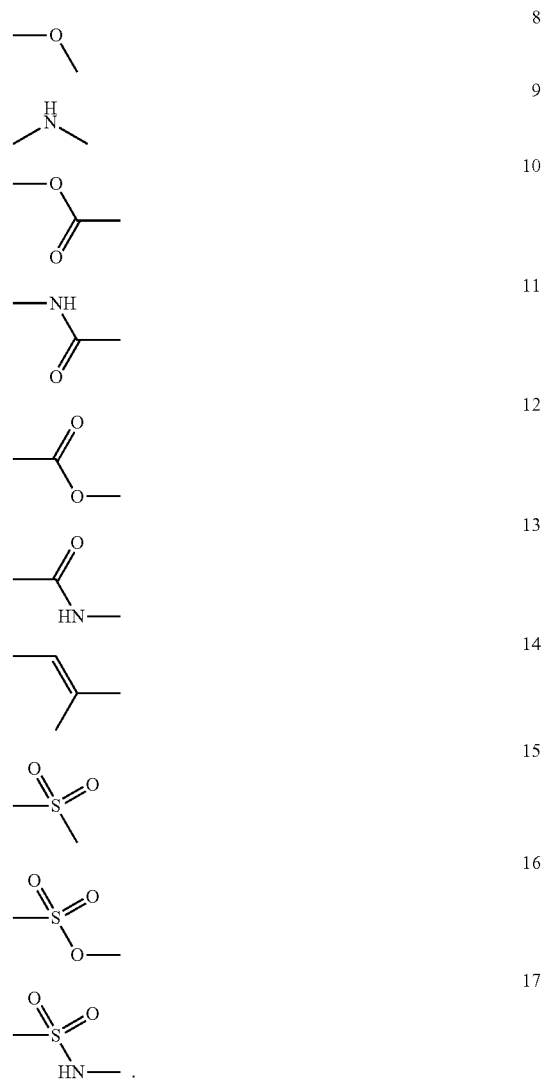

7. The metadielectric layer of claim 1, wherein the linker group L is selected from the list consisting of: —CH—, —CF$_2$—, —SiR$_2$O—, —CH$_2$CH$_2$O—, wherein R is selected from the list comprising H, alkyl, and fluorine.

8. The metadielectric layer of claim 1, wherein an energy interaction of the ionic liquid ions is less than kT, where k is Boltzmann's constant and T is a temperature of an environment.

9. The metadielectric layer of claim 1, wherein the organic, polarizable, resistive, polymeric compounds can form ordered or semi-ordered structures via hydrophobic-hydrophilic interactions and ionic interactions.

10. The metadielectric layer of claim 1, wherein the mixture of organic, polarizable, resistive polymeric compounds is electrically neutral.

11. The metadielectric layer of claim 1, wherein the layer's relative permittivity is greater than or equal to 1000.

12. The metadielectric layer of claim 1, wherein the layer's resistivity is greater than or equal to $10^{15}$ ohm-cm.

13. The organic polymeric dielectric formulation of claim 2 where in the plasticizer is a high boiling point aprotic solvent.

14. The organic polymeric dielectric formulation of claim 13 wherein the plasticizer is selected from: NMP, DMSO, and Propylene carbonate.

\* \* \* \* \*